Oct. 19, 1971  S. D. POOL ET AL  3,613,342
FRUIT CATCHER AND CONVEYOR SYSTEM
Filed Oct. 16, 1969  8 Sheets-Sheet 3
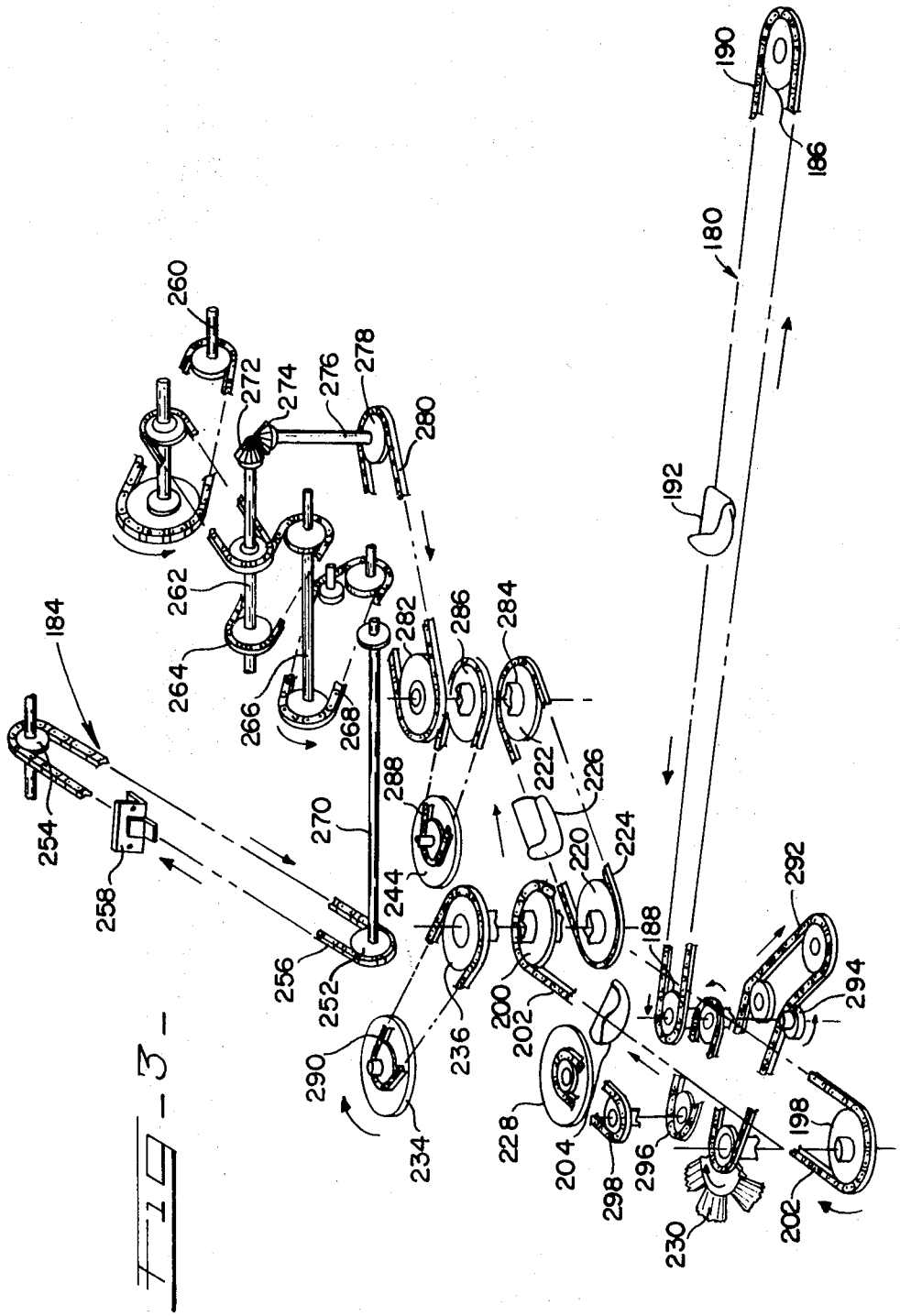
Fig-3-

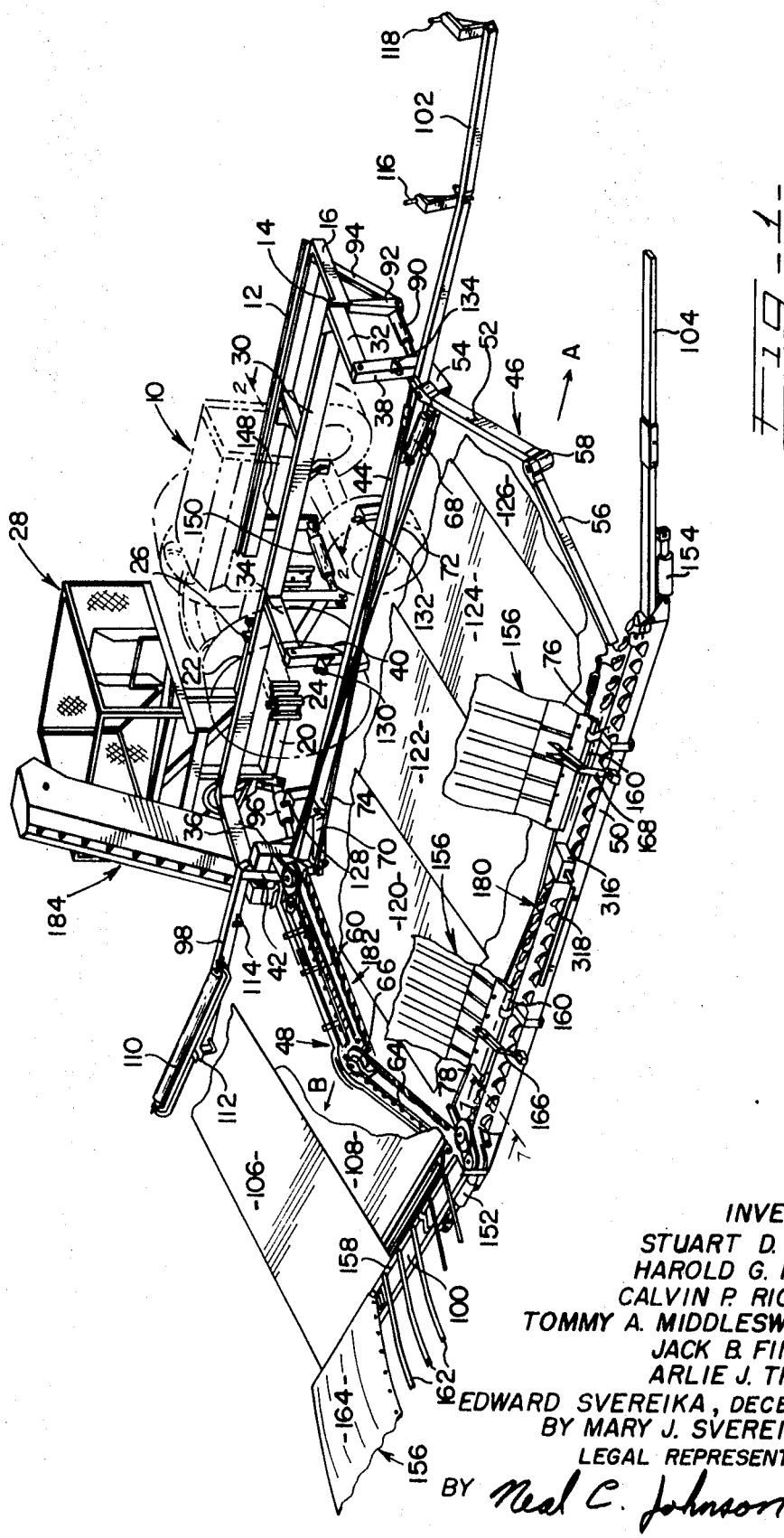

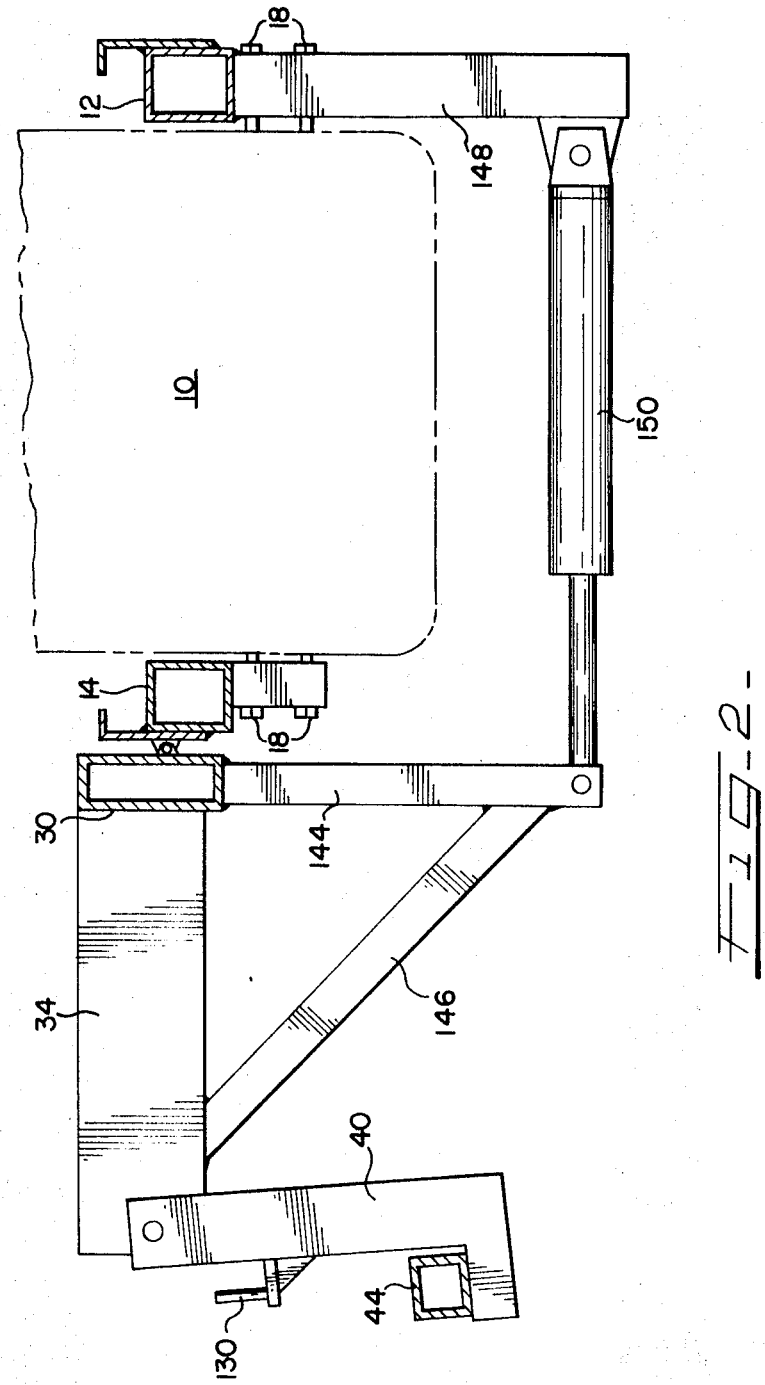

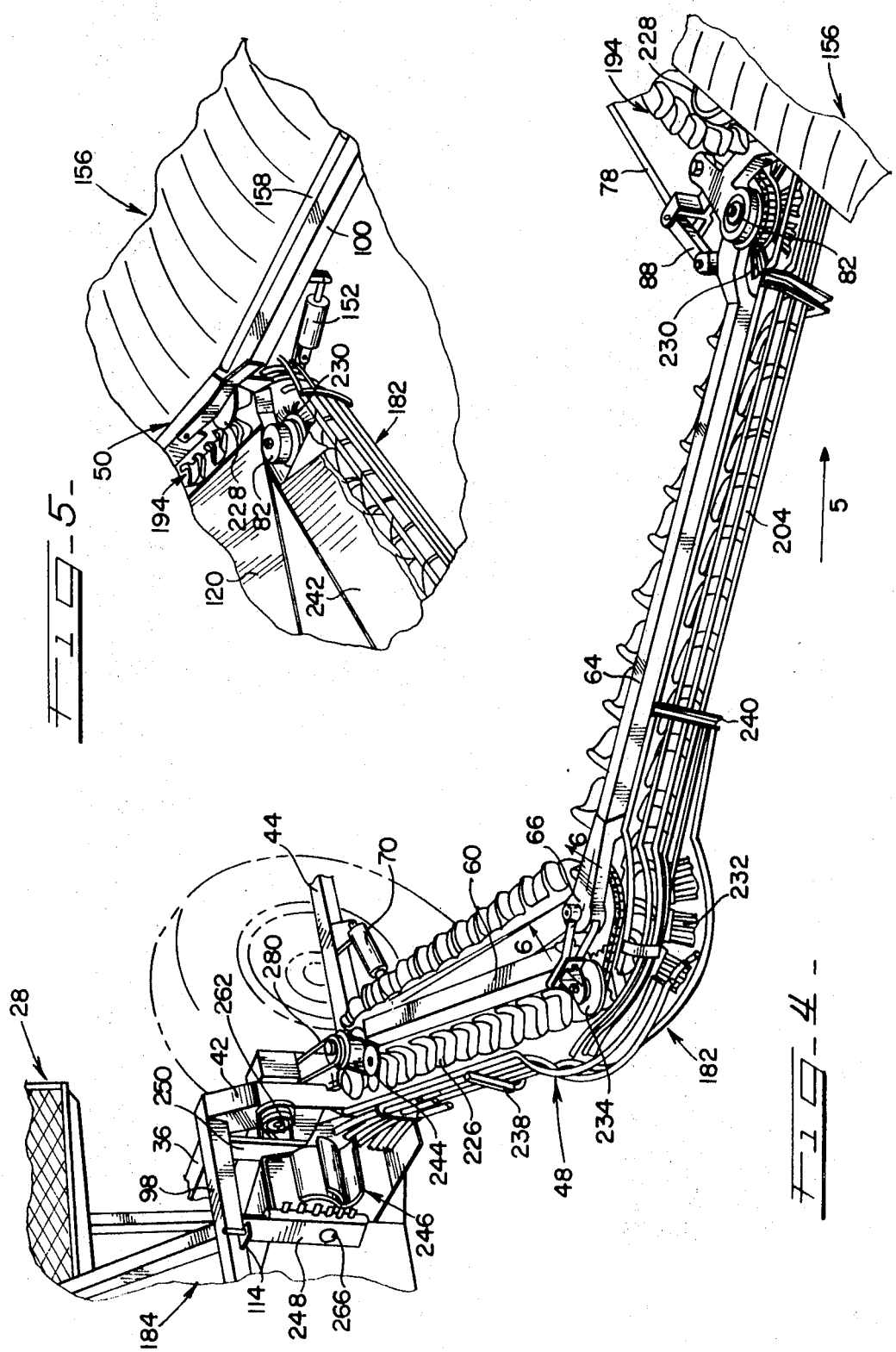

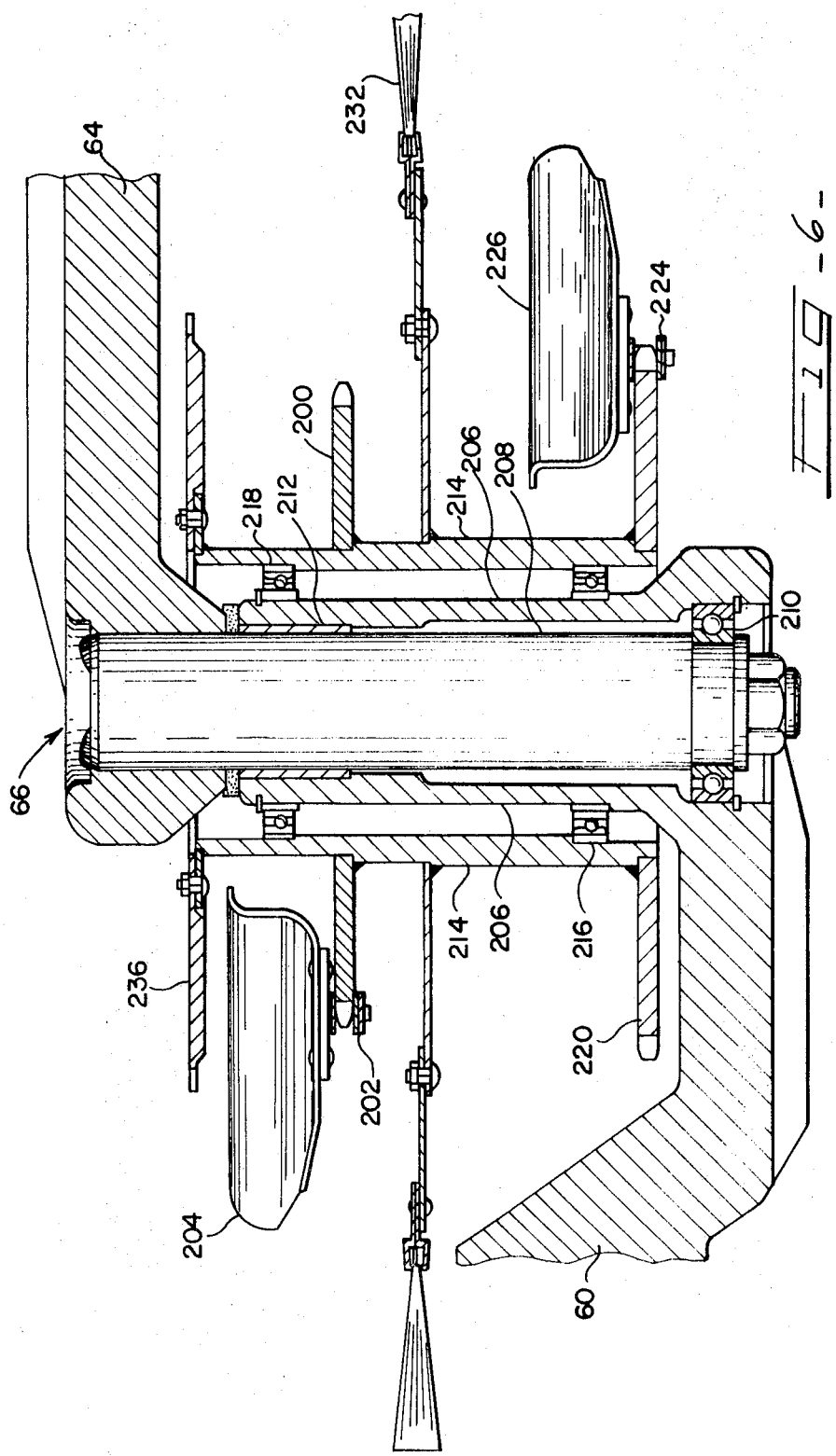

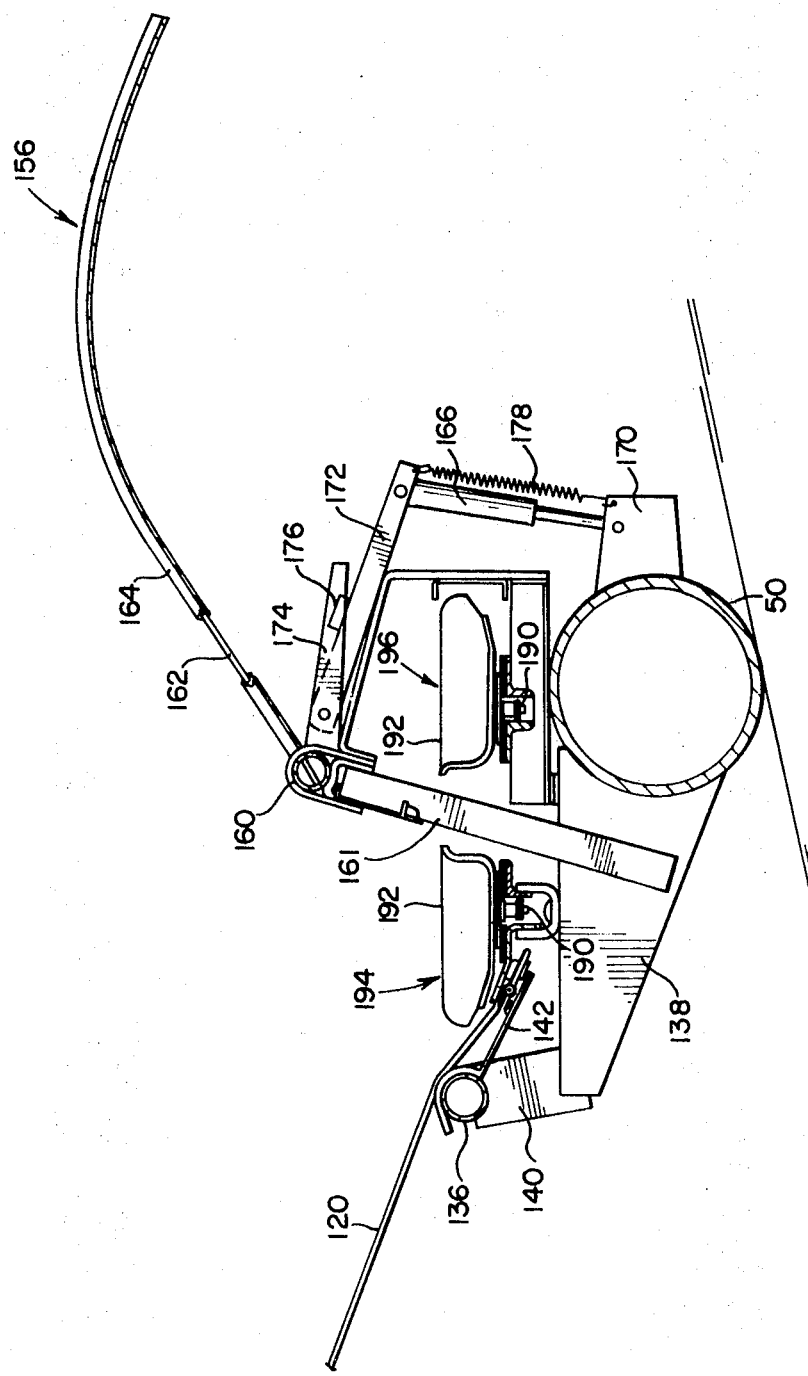

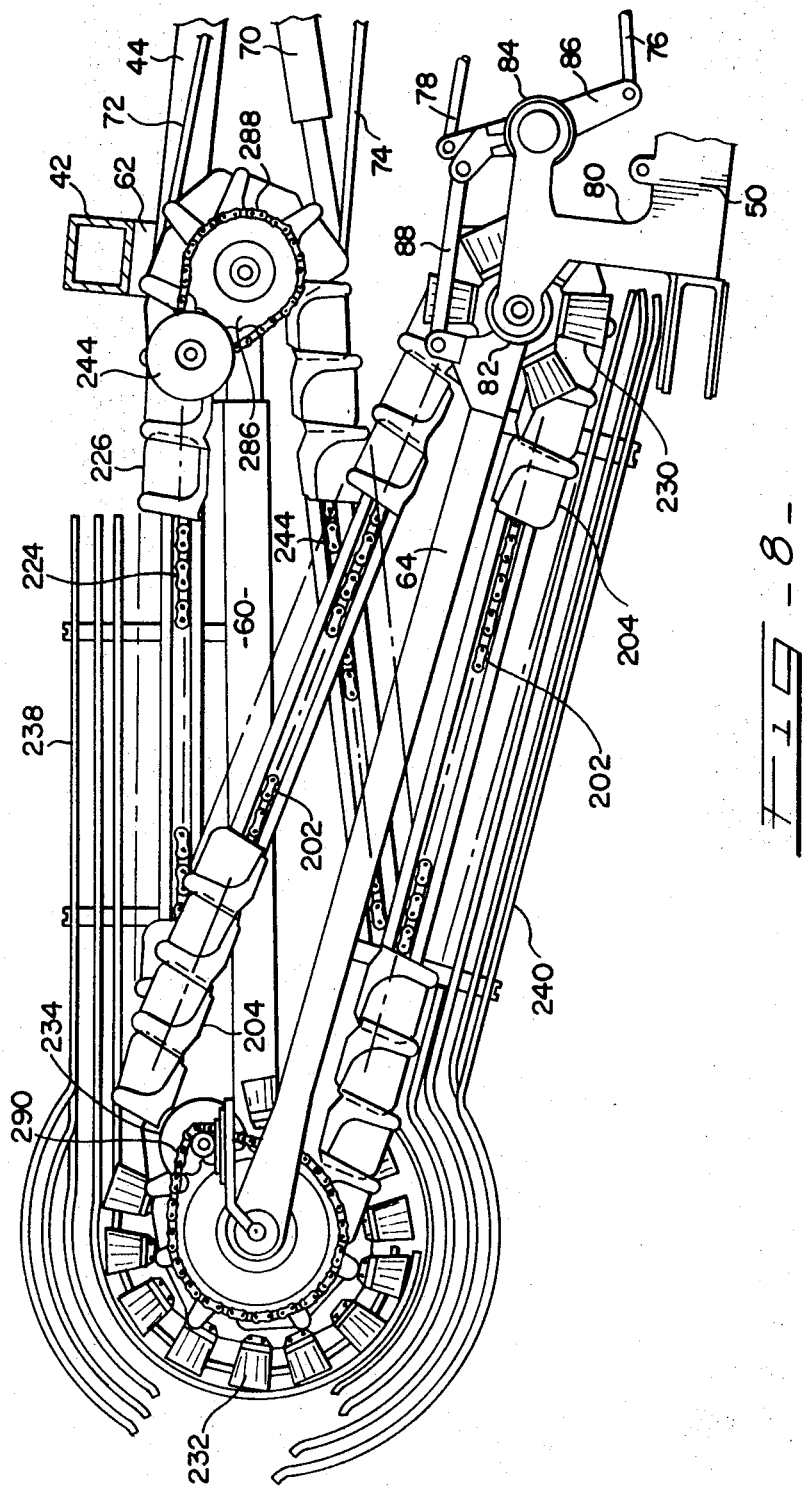

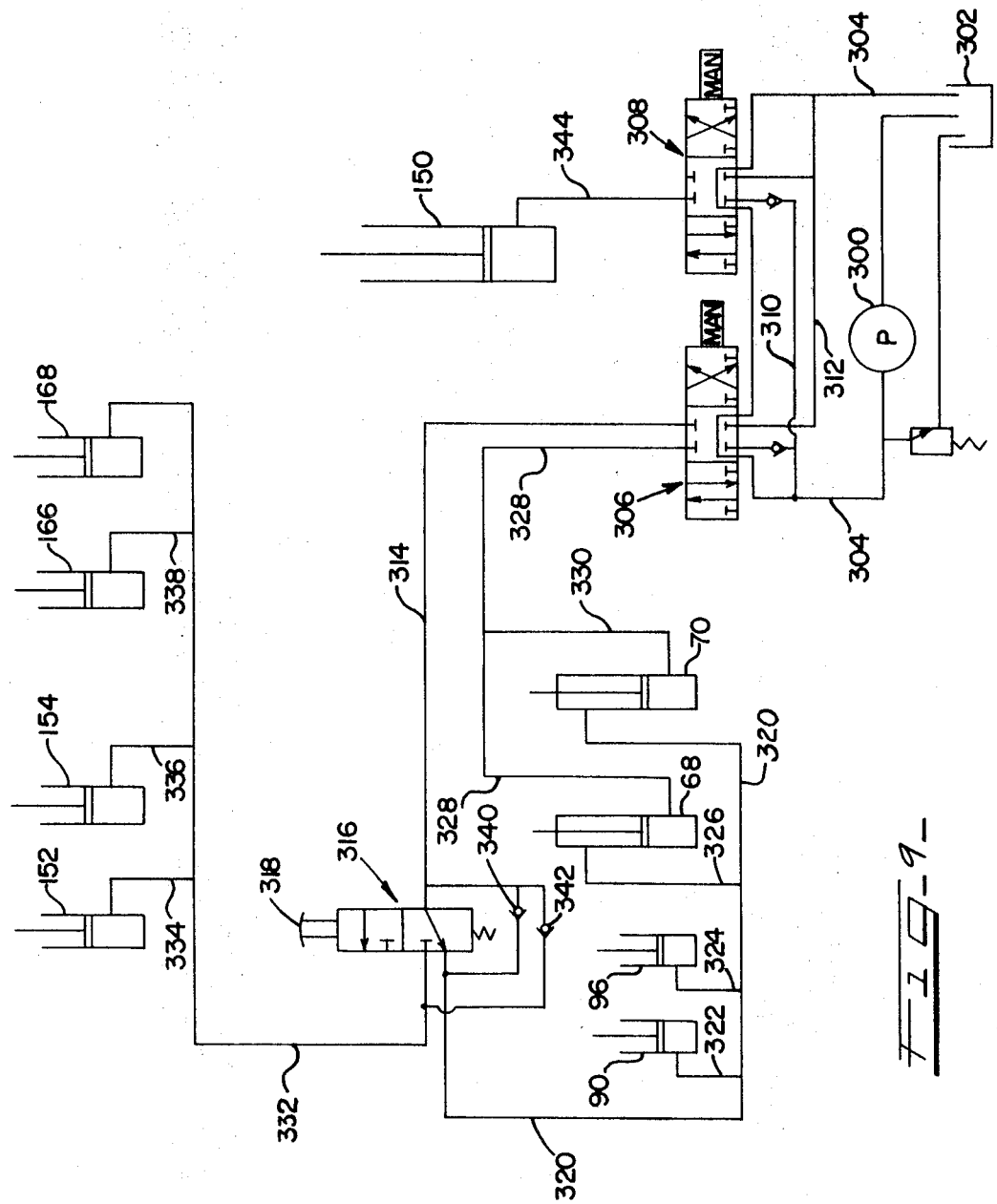

United States Patent Office 3,613,342
Patented Oct. 19, 1971

3,613,342
FRUIT CATCHER AND CONVEYOR SYSTEM
Stuart D. Pool, Wheaton, Harold G. Meitl, Clarendon Hills, Calvin P. Rickerd, La Grange Park, and Tommy A. Middlesworth, Hinsdale, Ill., Jack B. Findlay, Mound, Minn., and Arlie J. Thayer, Tinley Park, Ill., and Edward Svereika, deceased, late of Chicago, Ill., by Mary J. Svereika, legal representative, Chicago, Ill., assignors to International Harvester Company, Chicago, Ill.
Filed Oct. 16, 1969, Ser. No. 867,103
Int. Cl. A01g 19/06
U.S. Cl. 56—329
17 Claims

ABSTRACT OF THE DISCLOSURE

A self-propelled fruit harvester unit having a frame and a fruit-catching apron mounted for extension toward a tree to be harvested and retraction into a transport position. A conveyor on the frame collects fruit from the apron and conveys it to a foldable conveyor assembly which conveys it upwardly toward a collection point on the unit. The foldable conveyor assembly is mounted on the frame so as to pivot or fold as the frame is extended and retracted. Extension catcher assemblies and a gap closer apron are pivotally mounted on the frame and provide sloping surfaces for gravity feeding of fruit to the conveyor. Hydraulic means are operable to automatically stop the extension of the frame and to position the extension catcher assemblies and gap closer apron in response to engagement of the frame with a tree to be harvested.

BACKGROUND OF THE INVENTION

(1) Field of the invention

The invention relates generally to fruit-harvesting devices and more particularly to an improved mobile catcher and conveyor system for fruit shaken from trees.

(2) Prior art

The concept of an extensible and retractible fruit catcher and conveying device is disclosed in U.S. Pat. No. 3,347,032. It will be noted that the conveyor system includes an elevator 104 positioned adjacent to an end of the catcher apron. The elevator is thus disposed so that fruit may fall directly upon it causing bruising and damage to the fruit. Moreover, as the catcher frame is extended and retracted toward and away from the trunk of a tree to be harvested, the elevator is exposed for entanglement with the branches. Consequently, the branches may be broken and may also interfere with the operation of the elevator.

As shown in FIG. 2, the prior art elevator also presents a problem in that it is moved inwardly toward and across the mobile support as the catcher frame is retracted to a transport position. Accordingly, the design of the overall machine requires that the length of maximum extension of the catcher frame is limited by the length of the elevator which can be accommodated in a retracted position.

A general problem associated with fruit catchers is the capability of the device to catch and collect all the fruit above the device so as to prevent the fruit from rolling or bouncing onto the ground requiring follow-up manual collection. A further practical problem is the speed with which the catcher device can be set up in catching position.

The ground in citrus groves quite commonly consists of soft, sandy material. It has been found that the leading edge of an extensible catcher frame may tend to dig into the ground or encounter ground obstructions during extension toward a tree. This, of course, requires that the frame be constructed to resist the large imposed forces and also requires a considerable amount of power.

A common problem with mobile fruit harvesting and collecting devices is the lack of maneuverability of the machine to and between the work stations in a fruit tree grove. Normally, such groves present narrowly confined areas within which to maneuver the machine between the rows of trees to be harvested. The desire for machines of large fruit-gathering capacity has resulted in machines which are relatively large and cumbersome such that positioning annd maneuvering the machine within the small available areas presents time-consuming difficulties. Specifically, the fruit-catching assemblies are not readily disposable into a compact arrangement facilitating transport of the machine through areas restricted in size.

SUMMARY

The invention provides an improved mobile catcher and conveyor unit for a fruit-harvesting operation. The unit includes a mobile support on which a catcher assembly is mounted for extension toward a tree to be harvested. The unit includes a conveyor system having a conveyor which is foldable in response to extension and retraction of the catcher assembly. The catcher assembly is automatically oriented in a fruit-catching position and the extenson thereof is automatically halted in response to engagement of the catcher assembly with the tree.

An object of the invention is to provide a mobile tree harvester unit having a fruit catcher and conveyor assembly which is readily positionable into a fruit-catching attitude adjacent to a tree from which fruit is to be collected.

Another object is to provide a tree harvester unit having a fruit catcher and conveyor assembly which is retractible into a compact arrangement facilitating transport of the unit through narrow work areas.

Another object is to provide a fruit catcher and conveyor assembly which is readily extended to and retracted from a fruit-gathering position adjacent a tree without significant engagement with the tree branches resulting in a minimum of tree damage and interference of the branches with operation of the conveyors.

Yet another object is to provide a fruit catcher and conveyor assembly which is readily extensible toward a tree without digging into the ground or being impeded by ground obstructions with the result that power requirements are at a minimum.

Still another object is to provide an assembly which is automatically disposed in a fruit-gathering position in response to engagement of the assembly with the tree to be harvested.

BRIEF DESCRIPTION OF THE DRAWINGS

FIG. 1 is a fragmentary perspective view of the mobile fruit catcher and conveyor assembly of the invention;

FIG. 2 is a sectional view taken substantially on line 2—2 of FIG. 1;

FIG. 3 is a schematic view of the mechanical power drive system for the conveyor assembly of the invention;

FIG. 4 is a fragmentary perspective view of the foldable conveyor assembly of the invention;

FIG. 5 is a fragmentary perspective view illustrating the juncture between the longitudinal conveyor and the foldable conveyor, taken generally in the direction of arrow 5 of FIG. 4;

FIG. 6 is a fragmentary sectional view taken substantially along line 6—6 of FIG. 4 and illustrating the pivot joint connection between the outer and inner arms of a foldable arm assembly;

FIG. 7 is a fragmentary sectional view taken substantially along line 7—7 of FIG. 1;

FIG. 8 is a fragmentary plan view of the foldable conveyor assembly disposed in folded or retracted position; and FIG. 9 is a schematic view of the hydraulic system for extending and retracting the conveyor and catcher assembly of the invention.

DESCRIPTION OF THE PREFERRED EMBODIMENT

Referring first to FIG. 1, there is shown in phantom lines a tractor 10 of the agricultural type upon which the catcher and conveyor assembly of the invention is adapted to be mounted by means including a mounting frame including a pair of frame members 12 and 14 mounted on opposite sides respectively of the tractor 10 and extending longitudinally thereof in parallel relation. Crossbraces 16 interconnect the frame members 12 and 14 at spaced intervals to rigidify the frame which is mounted on opposite sides of the tractor 10 by suitable attaching means including bolts 18 shown in FIG. 2. Reference to assignee's copending application Ser. No. 743,436, now Patent 3,546,866, filed July 9, 1968 will reveal that the above described frame is the same as frame 11 in that application and is adapted to support a tree shaker apparatus.

A rear frame assembly includes a pair of beams 20 and 22 mounted on the rear axle housing of the tractor by clamp assemblies 24 and 26 respectively. A collection bin 28 is supported on the beams 20 and 22 by suitable columns and braces shown generally in FIG. 1. A longitudinally extending beam 30 is pivotally mounted alongside the frame member 14 as best shown in FIG. 2, with the rearward end of the beam being pivotally mounted on one of the columns supporting the collection bin 28. Arms 32, 34, and 36 are rigidly secured to and extend laterally from the beam 30 at the front end, center, and rear end thereof respectively. Link members 38, 40, and 42 are coaxially pivotally suspended from the arms 32, 34, and 36 respectively.

An extensible and retractible frame assembly is adapted to be supported from the links 38, 40, and 42. The frame assembly includes an inboard frame member 44 fixed on the lower ends of the links 38, 40, and 42; a pair of thrust arm assemblies 46 and 48 pivotally mounted on the links 38 and 42 respectively; and an outboard frame member 50 pivotally mounted on the arm assemblies and extending in parallel relation to the inboard frame member 44. The arm assembly 46 includes an inner arm 52 pivotally mounted on a lateral extension 54 of the link 38 and an outer arm 56 pivotally connected to the outboard frame member 50. The arms 52 and 56 are pivotally joined at a pivot joint 58. Similarly, the arm assembly 48 includes an inner arm 60 pivotally mounted on an extension 62 (FIG. 8) of the link 42 and an outer arm 64 pivotally connected to the outboard frame member 50. The arms 60 and 64 are pivotally joined at a pivot joint 66 similar to the pivot joint 58.

The above described frame assembly is adapted for powered extension and retraction to move the outward frame member 50 outwardly toward a tree to be harvested and inwardly toward the tractor into a position facilitating transport of the machine. A hydraulic cylinder 68 is pivotally mounted between the inboard frame member 44 and the inner arm 52. Similarly, a hydraulic cylinder 70 is pivotally mounted between the frame member 44 and the inner arm 60. Simultaneous extension of the cylinders 68 and 70 folds the arm assemblies 46 and 48 in the direction of arrows A and B respectively to move the outboard frame member 50 toward the inboard frame member 44. Retraction of the cylinders 68 and 70 unfolds the arm assemblies and moves the frame member 50 to the position of FIG. 1.

The frame assembly includes means for maintaining the outboard member 50 in parallel relation to the inboard member 44 as the frame assembly is extended and retracted. A pair of rods 72 and 74 are coupled between the inner arms 52 and 60 in cross-over relation. Somewhat similarly, a pair of rods 76 and 78 are connected in crossover relation between the outer arms 56 and 64.

The connection of the rods 76 and 78 to arm 64 is different in some respects from the connection of the rods to the arms 52, 56, and 60 in that an intermediate linkage is provided. As best shown in FIG. 8, the outboard frame member 50 includes a T-shaped extension 80 which provides a pivot joint 82 by which the outer arm 64 is pivotally connected to the member 50. The extension 80 also includes a pivot joint 84 receiving an arm 86 to which the rods 76 and 78 are coupled. A link 88 interconnects the arm 64 with the arm 86 so that pivoting movement of the arm 64 relative to the frame member 50 is transmitted to the rods 76 and 78. It will be seen that the rods 72 through 78 serve to insure that the arm assemblies 46 and 48 each fold simultaneously to the same extent thereby maintaining the outboard frame member 50 in parallelism with the inboard frame member 44.

The catcher and conveyor assembly of the invention includes means for creating a lifting force on the outward edge of the frame assembly as the same is extended along the ground toward a tree to be harvested. A hydraulic cylinder unit 90 is pivotally mounted on a strut 92 secured to the frame member 14. A brace 94 extends between the strut 92 and the frame member 12 as shown. The piston rod of the cylinder unit 90 is pivotally connected to the lower end of the link 38 such that the cylinder unit 90 extends generally parallel to the arm 32. A hydraulic cylinder unit 96 is pivotally connected to the beam 20. The piston rod of the cylinder unit 96 is pivotally connected to the lower end of the link 42 such that the cylinder unit 96 extends generally parallel to the arm 36. As the cylinders 68 and 70 are retracted to extend the frame assembly, the cylinders 90 and 96 are simultaneously extended to pivot the frame assembly upwardly about the coaxial pivot connections of the links 38, 40, and 42 to the arms 32, 34, and 36. Accordingly, the outboard frame member 50 is lifted relative to the tractor so as to "float" across the ground as it is extended toward the tree to be harvested.

The catcher and conveyor assembly of the invention includes extension catcher assemblies mounted on the opposite ends of the above described frame assembly. Referring still to FIG. 1 an inner bear 98 extends from the link 42 in generally parallel relation to the inboard frame member 44. An outer beam 100 is pivotally connected to an end of the outboard frame member 50 in generally parallel relation to the inner beam 98. On the opposite end of the frame assembly an inner beam 102 is coupled generally coextensively with the inboard frame member 44. An outer beam 104 is pivotally mounted on an end of the outboard frame member 50 in generally parallel relation to the inner beam 102.

The extension catcher assembly defined by the beams 98 and 100 includes a pair of flexible strips or webs of rubberized fabric such as shown at 106 and 108. Each of the webs 106 and 108 is secured at its outer end to the beam 100. The inner end of each web is secured on a self-winding roller such as shown at 110 mounted on a bracket 112 on the beam 98. The roller (not shown) for the web 108 is adapted to be mounted on a bracket 114 on the beam 98. The extension catcher assembly defined by the beams 102 and 104 is likewise adapted to include a pair of strips or webs (not shown) similar to the webs 106 and 108. These webs are secured to the beam 104 and extend upwardly therefrom for mounting on rollers (not shown) similar to the roller 110. These rollers are adapted for mounting on brackets 116 and 118 secured on the beam 102.

The frame assembly likewise includes a plurality of flexible webs shown partially at 120, 122, 124, and 126 extending upwardly from the frame member 50. Each of these webs is mounted on a roller (not shown) similar to the roller 110. The mounting brackets for the rollers supporting the webs 120, 122, 124, and 126 are shown at 128, 130, 132, and 134 respectively. Each of the webs is secured at its outer edge by structure shown in FIG. 7 with reference to the web 120. A tube 136 is mounted on the outboard frame member 50 by suitable brackets 138 and 140 so as to extend longitudinally of the member 50 in parallel relation. A clip member 142 is secured to the outer edge of the web 120 and is mounted on the tube 136 as shown. It will be understood that the beams 100 and 104 likewise include similar structure for securing the respective webs thereto.

The webs are arranged in successively overlapping relation and define an inclined fruit-catching apron overlying the supporting framework for gravity feeding of the fruit toward a conveyor system to be subsequently described. When extended in fruit-catching relation the angle or degree of inclination of the apron may be varied as desired by structure to be now described with reference to FIGS. 1 and 2. A strut 144 is rigidly secured to the beam 30 annd extends downwardly therefrom as shown. A brace 146 extends between the arm 34 and the strut 144 to rigidify the structure. A strut 148 is rigidly secured to and extends downwardly from the frame member 12 so as to be disposed on the opposite side of the tractor 10 from the strut 144. A hydraulic cylinder 150 is pivotally connected between the struts 144 and 148 and extends beneath the tractor 10. It will be seen that extension of the cylinder 150 pivots the beam 30 about its connections with the frame member 14 thereby lifting the links 38, 40, and 42 and the inboard edge of the framework supporting the fruit-catching apron.

The above described extension catcher assemblies are adapted for upward pivoting movement relative to the outboard frame member 50 to dispose the same in gravity feed relation to the apron defined by the webs 120, 122, 124, and 126. Referring still to FIG. 1, hydraulic cylinders 152 and 154 are pivotally mounted on opposite ends respectively of the frame member 50 and are pivotally connected to the beams 100 and 104 respectively. Extension of the cylinders 152 and 154 causes the beams 100 and 104 to swing upwardly to dispose the webs thereon in gravity feed relation toward the apron defined by the webs 120, 122, 124, and 126.

The catcher and conveyor assembly of the invention is adapted to be used in conjunction with a similar machine disposed on the opposite side of the tree to be harvested. In order to provide a catching surface at the gap formed at the tree between the two machines, the assembly includes a gap closer apron 156. The apron 156 is shown fragmentally to better illustrate other structure but it will be understood that the apron 156 extends continuously along the length of the beam 100, outboard frame member 50, and the beam 104. The apron 156 includes a rod 158 pivotally mounted on the beam 100, a rod 160 pivotally mounted on the frame member 50, and a rod (not shown) pivotally mounted on beam 104 in the same manner as the illustrated rods 158 and 160. The rod 160 is mounted above the frame member 50 by suitable supports one being shown at 161 in FIG. 7. A plurality of flexible fingers 162 extend outwardly from the rods 158 and 160 at spaced intervals along the rods to provide support for a flexible panel 164 of rubberized fabric mounted thereon and extending the length of the beam 100, frame member 50, and beam 104.

The gap closer apron 156 is adapted for powered actuation from a position extending generally horizontally from the supporting framework to an upwardly and outwardly inclined position for gravity feeding of fruit toward a conveyor system to be described. As shown generally in FIG. 1, a pair of hydraulic cylinders 166 and 168 are mounted on the frame member 50 and extend upwardly for connection to the apron 156. The details of this arrangement are shown more clearly in FIG. 7 wherein the cylinder 166 is shown pivotally connected between a bracket 170 and an end of a link 172. The opposite end of the link 172 is pivotally coupled to an arm 174 which is rigidly secured to the rod 160. A shoulder 176 on the arm 174 is engageable against the top edge of the link 172. Extension of cylinder 166 moves the link 172 and arm 174 upwardly to thus pivot the apron 156 upwardly to an inclined fruit-feeding position. Since the cylinder 166 is of the single-acting type, a spring 178 is connected between the bracket 170 and link 172 to pivot the apron 156 back to its generally horizontal position in response to exhausting pressure fluid from the cylinder. It will be understood that the cylinder 168 is arranged in the same manner as the above described arrangement of the cylinder 166. Both cylinders are adapted to be actuated simultaneously for pivoting the entire apron 156 as a unit.

The above described linkage also permits the apron 156 to be pivoted back toward the tractor in a position facilitating transport of the machine. The transport position is shown in FIG. 1 wherein the portions of apron 156 shown mounted on the frame member 50 are disposed in an inward and upward inclination. Accordingly, the apron does not extend outwardly beyond the edge of the machine defined by the beams 100 and 104 and the frame member 50.

The device of the invention includes a conveyor system for conveying fruit caught on the various aprons to the collection bin 28 on the tractor. As shown generally in FIG. 1, an endless conveyor 180 is mounted on the outboard frame member 50 and extends substantially the length thereof. The conveyor 180 is adapted to convey fruit is a foldable conveyor 182 mounted on the thrust arm assembly 48. An elevator 184 is suspended from the beam 98 and extends upwardly for conveying fruit from the foldable conveyor 182 into the bin 28.

As shown in FIG. 3, the conveyor 180 includes a pair of sprockets 186 and 188 having an endless chain 190 trained thereon. A plurality of closely spaced cups 192 are mounted on the chain 190. The placement of the conveyor 180 relative to the fruit-catching webs and the gap closer apron 156 is shown in FIG. 7. The conveyor 180 has a carrying run 194 which disposes the cups 192 in position to receive fruit from the apron 156 and the webs as typified by the illustrated web 120. A return run 196 is disposed beneath the apron 156 as shown. As shown in FIGS. 4 and 5, the carrying run 194 is arranged to deliver fruit to the outer end of the foldable conveyor 182.

In general, the foldable conveyor 182 includes an outer section on the outer arm 64 and an inner section on the inner arm 60. As shown in FIG. 3, the outer section includes a pair of sprockets 198 and 200 on which an endless chain 202 is trained. A plurality of cups 204 (similar to the cups 192) are mounted on the chain 202 in closely spaced relation. The sprocket 198 is journaled for rotation about the axis defined by the pivot joint 82 interconnecting the arm 64 to the frame member 50 (FIGS. 4 and 8). As shown in FIG. 6, the sprocket 200 is journaled for rotation about the axis of the pivot joint 66 interconnecting the arms 60 and 64. The joint 66 includes a hub 206 extending upwardly from the end of the arm 60. A spindle 208 is secured to the arm 64 and is journaled within the hub 206 by bearings 210 and 212. A sleeve 214 is journaled around the hub 206 by bearings 216 and 218. The sprocket 200 is mounted on the sleeve 214 for rotation therewith.

As shown generally in FIG. 3, the inner section of the foldable conveyor includes a pair of sprockets 220 and 222 on which an endless chain 224 is trained. A plurality of cups 226 are mounted on the chain 224 in closely spaced relation. The sprocket 222 is journaled for rotation about the axis of the pivot joint interconnecting the arm 60 to the link 42 (FIG. 8). The other sprocket 220 is mounted on the sleeve 214 beneath the sprocket 200 as shown in FIG. 6.

As shown in FIGS. 4 and 5, a spinner 228 is journaled on the frame member 50 proximate to the area at which the conveyor 180 delivers fruit to the foldable conveyor 182. The spinner 228 is adapted to rotate faster than the speed of movement of the cups 192. Accordingly, fruit engaged by the rotating spinner is moved rapidly toward the foldable conveyor.

A rotary brush-like spinner 230 (FIGS. 3, 4, 5, and 8) is journaled on the pivot joint 82 above the cups 204 of the foldable conveyor. The rotating spinner 230 is disposed in the path of movement of the fruit as the same is delivered by the cups 192. The spinner 230 assists in transferring the fruit onto the cups 204.

A brush-like spinner 232 similar to the spinner 230 is mounted on the sleeve 214 between the cups 204 and 226 as shown in FIG. 6. Another spinner 234 (FIGS. 3, 4, and 8) is mounted on the pivot joint 66 above the cups 204. The spinner 234 is chain driven from a sprocket 236 mounted on the sleeve 214 (FIG. 6). The spinner 234 functions in the same manner as the spinner 228 in that its rotating periphery engages the fruit to assist in removing it from the cups 204. The spinner 232 engages the fruit delivered from the cups 204 and assists in directing the fruit onto the cups 226. It will thus be seen that the spinners 232 and 234 are effective in transferring the fruit past the pivot joint interconnecting the outer and inner sections of the foldable conveyor 182. Moreover, the transfer is effected throughout a wide range of angles of the arms 60 and 64 relative to each other.

As shown generally in FIG. 4, guide rail assemblies 238 and 240 are mounted on the arms 60 and 64 respectively adjacent to the fruit-carrying runs of the foldable conveyor so that large volumes of fruit may be moved without spillage. Further, as shown in FIG. 5, a covering 242 of canvas material or the like may be mounted over the foldable conveyor sections to prevent the fruit from spilling over the edges when the volume of fruit is especially large. A chain driven spinner 244 (FIGS. 3, 4, and 8) may be mounted on the arm 60 in a position above the cups 226 for assisting in removing fruit from the cups and directing it toward the bottom end of the elevator 184.

As shown in FIG. 4, a conveyor in the form of a paddle wheel 246 is journaled in the entrance to the elevator 184 for moving the fruit into the elevator as received from the foldable conveyor. In practice, the paddle wheel 246 is supported by a pair of strap members 248 and 250 suspended from the beam 98 on opposite sides of the elevator 184. The elevator itself is pivotally mounted on the bearing structure supporting the paddle wheel on the strap members. The elevator 184 (FIG. 3) includes pair of sprockets 252 and 254 journaled at opposite ends thereof for receiving an endless chain 256 thereon. A plurality of paddles 258 are mounted on the chain 256 for moving the fruit upwardly and into the bin 28.

The mechanical drive system for driving the above described conveyors, spinners, paddle wheel, and elevator is shown schematically in FIG. 3. Power is taken from a PTO 260 at the rear of the tractor and is transferred through an arrangement of sprockets and chains to a shaft 262. In practice, the shaft 262 is journaled at the pivot connection of the link 42 on the arm 36 (FIG. 4). Power is transferred by a chain 264 to a shaft 266 which drives the paddle wheel 246 (FIG. 4). A chain 268 drivingly engages a shaft 270 for running the elevator 184.

Power is transferred to the conveyors on the extensible frame assembly by means to be now described with reference to FIG. 3. A bevel gear 272 is mounted on an end of the shaft 262 and is disposed in driving engagement with a bevel gear 274 mounted on a substantially vertically disposed shaft 276. In practice, the shaft 276 is mounted alongside the link 42. A sprocket 278 is mounted on the lower end of the shaft 276 for driving an endless chain 280 which extends outwardly as also shown in FIG. 4. The chain 280 is received on a sprocket 282 which is mounted on a shaft 284. The shaft 284 is disposed coaxially with the pivot connection of the arm 60 on the extension 42 (FIG. 8). A sprocket 286 is mounted on the shaft 284 for driving a chain 288 connected to the spinner 244. The arrangement of the sprocket 286, chain 288, and spinner 244 is also shown in FIG. 8.

The sprocket 222 is also mounted on the shaft 284 so as to drive the chain 224 on which the cups 226 of the inner conveyor section are mounted. The power train connection between the inner and outer sections of the foldable conveyor has been previously described with reference to FIG. 6. An endless chain 290 drivingly interconnects the sprocket 236 and the spinner 234.

As described above, the spinner 230 is mounted coaxially with the sprocket 198 for rotation therewith. An endless chain 292 drivingly interconnects the spinner 230 with a sprocket 294 suitably journaled on the outer frame member 50. The sprocket 188 is mounted coaxially above the sprocket 294 and driven therewith to drive the longitudinal conveyor 180. The spinner 228 is driven from the sprocket 294 by means of chains 296 and 298 arranged substantially as shown in FIG. 3.

The hydraulic system for disposing the fruit-catching structure between operative and transport position is shown schematically in FIG. 9. Hydraulic power is provided by a pump 300 which draws hydraulic fluid from a sump or reservoir 302. In practice, the pump and sump are part of the conventional hydraulic system of the tractor 10. The pump 300 supplies pressure fluid through a pressure line 304 to a pair of flow control valves 306 and 308 connected in series by the line 304 which leads back to the sump 302. In the illustrated embodiment of the invention, each of the valves 306 and 308 comprises a three-position, four-way, spring-centered, manually-operated, open center type valve of known construction. In practice, the valves are mounted on the tractor 10 in positions readily accessible to the operator. A pressure line 310 branches from the line 304 and connects with the valves 306 and 308 as shown. A line 312 connects each of the valves to the line 304 and thus back to the sump 302.

It will be seen that with both the valves 306 and 308 in neutral position as shown, the pump 300 will deliver pressure fluid through the pressure line 304 to the valves 306 and 308 and then back to the sump 302. The hydraulic circuit including the lines 310 and 312 provides pressure fluid at the valves 306 and 308 regardless of whether either valve is actuated. In other words, pressure fluid is available at the valve 308 even if the valve 306 is actuated.

A line 314 extends from the valve 306 to a valve 316 adapted to be mounted on the outer frame member 50 as shown generally in FIG. 1. A bumper 318 is pivotally mounted on frame member 50 and projects outwardly therefrom in a position to be engaged by the trunk of the tree toward which the catcher assembly is being extended. Suitable linkage interconnects the bumper 318 with the valve 316 so that the valve is shifted from the illustrated position of FIG. 9 in response to engagement of the bumper with the tree. In practice, the valve 316 comprises a two-position, three-way, spring-biased, manually operated valve of known construction.

A line 320 extends from the valve 316 to the rod end of the double-acting cylinder 70. Branch lines 322 and 324 connect the cylinders 90 and 96 respectively with the line 320 and a line 326 extends from the line 320 to the rod end of the double-acting cylinder 68. A line 328 extends from the head end of the cylinder 68 to the valve 306 and a branch line 330 interconnects the head end of the cylinder 70 and the line 328.

A line 332 extends from the valve 316 to the cylinder 168. Branch lines 334, 336, and 338 connect the line 332 with the cylinders 152, 154, and 166 respectively. A check valve 340 is connected between the lines 320 and 314 and a check valve 342 is connected between the lines 332 and 314 so that flow may bypass the valve 316. Referring still to FIG. 9, it will be seen that a line 344 extends between flow control valve 308 and the cylinder 150.

In operation, the catcher assembly is extended by shifting the valve 306 to the left as viewed in FIG. 9 so that pressure fluid will be pumped through the lines 304 and 310 into line 314. The valve 316 is spring-biased into the position shown such that the pressure fluid flows into the line 320 to extend the cylinders 90 and 96 and retract the cylinders 68 and 70. The fluid forced from the cylinders 68 and 70 flows through the lines 328 and 330 back to the valve 306 and then back to the sump 302 by way of the lines 312 anh 304. As described above, extension of the cylinders 90 and 96 creates a lifting force on the outer frame member 50 in conjunction with the extension of the frame assembly.

When the bumper 318 engages the trunk of the tree to be harvested, the valve 316 is shifted downwardly as viewed in FIG. 9 thereby stopping the flow of pressure fluid to the cylinders 90, 96, 68, and 70 and directing the same through the lines 332, 334, 336, and 338 to extend the cylinders 152, 154, 166, and 168. These cylinders act to raise the extension frame assemblies and the gap closer apron. The valve 306 may then be returned to its neutral position while the tree shaking and fruit conveying operations are performed.

If required, the operator may extend the cylinder 150 by actuating the valve 308 to raise the inboard edge of the catcher assembly to thus vary its degree of inclination.

To retract the catcher assembly, the valve 306 is shifted to the right as viewed in FIG. 9. Pressure fluid is thus caused to flow through lines 328 and 330 to extend the cylinders 68 and 70. The check valve 340 permits the fluid expelled from the cylinders 90, 96, 68, and 70 to bypass the valve 316 and flow through the line 314 back to the valve 306 and then to the sump. At the same time the cylinders 152, 154, 166, and 168 will be connected to the sump by means of the check valve 342 permitting flow around the valve 316. The weight of the structure supported by the cylinders 90, 96, 152, and 154 is sufficient to cause retraction of these cylinders. The spring 178 associated with each of the cylinders 166 and 168 acts to retract these cylinders. As the bumper 318 moves out of engagement with the tree trunk the valve 316 will be spring-biased to its original position shown in FIG. 9. Upon complete retraction of the catcher assembly, the valve 306 is shifted back to its neutral position.

During the tree-shaking operation, the fruit will fall onto the various aprons which gravity-feed the fruit toward the conveyor 180. The fruit is conveyed thereby to the foldable conveyor 182 which conveys the fruit to the paddle wheel 246 and thus into the elevator 184 and into the bin 28. The drive system for the conveyors and elevator is actuated by the operator through suitable clutch mechanisms not shown. Upon retraction of the frame assembly, the gap closer apron 156 is manually pivoted to its upwardly and inwardly inclined position for transport. The bin 28 may include suitable gate means facilitating emptying the fruit into boxes for shipment.

By the foregoing it will be seen that the harvester unit of the present invention is uniquely suited to a fruit-harvesting operation.

What is claimed is:

1. In a fruit harvester including a mobile support, a catcher and conveyor system comprising:
   an extensible and retractable frame mounted on said support and including an outboard member extending longitudinally of the frame, a foldable arm assembly pivotally interconnecting said outboard member with said support for moving said outboard member toward and away from said support, a fruit-catching apron extending between said support and said outboard member; and
   a foldable conveyor assembly mounted on said arm assembly for coincident folding movement with said arm assembly as said outboard member is moved toward and away from said support.

2. The subject matter of claim 1, including means for raising and lower said outboard member relative to the support.

3. The subject matter of claim 1, including means for raising and lowering the inner edge of said frame relative to said support for varying the attitude of the frame.

4. The subject matter of claim 1, including a conveyor on said frame adjacent to said apron for conveying fruit from said apron to said foldable conveyor.

5. The subject matter of claim 1, wherein said foldable arm assembly includes a first arm member pivotally coupled to said outboard member, a second arm member pivotally coupled to said first arm member and to said support, said foldable conveyor assembly having a first endless conveyor on said first arm member and a second endless conveyor on said second arm member, said first and second conveyors arranged for sequentially conveying fruit from said apron on said first conveyor to said second conveyor toward said support.

6. A tree crop harvester comprising:
   a mobile support;
   an extensible and retractable frame mounted on said support for textension toward the trunk of the tree to be harvested and retraction toward said support;
   a fruit-catching apron on said frame for disposition beneath the fruit-bearing branches of the tree; and
   a folding conveyor assembly on said frame for conveying fruit from said apron toward said support, said conveyor assembly including a pivot connection intermediate its ends enabling said conveyor assembly to fold in response to extension and retraction of said frame.

7. The subject matter of claim 6, wherein said apron overlies said foldable conveyor assembly.

8. The subject matter of claim 6, including power means for varying the attitude of said frame relative to said support 9. The subject matter of claim 6, including power means for simultaneously extending said frame and lifting the treeward edge thereof, whereby the frame may be extended toward the tree without interference with ground obstructions.

10. The subject matter of claim 6, including power means for extending said frame, and means operative to cease actuation of said power means in response to engagement of said frame with a tree to be harvested, whereby frame extension is automatically halted.

11. A tree crop harvester comprising:
   a mobile support;
   an extensible and retractable frame mounted on said support and extending outwardly and downwardly therefrom for extension toward the trunk of a tree to be harvested and retraction toward the support;
   a fruit-catching apron on said frame for extension and retraction therewith; and
   power means for simultaneously extending said frame and lifting the outer edge thereof, whereby the frame may be extended toward the tree without interference with ground obstructions.

12. The subject matter of claim 11, including means for raising and lowering the inner edge of said frame relative to the support to vary the outward and downward inclination of the frame.

13. The subject matter of claim 11, including means operative to cease actuation of said power means in response to engagement of said frame with a tree to be harvested, whereby frame extension is automatically halted.

14. The subject matter of claim 11, including a foldable conveyor assembly on said frame for conveying fruit from said apron toward said support, said conveyor assembly including a pivot joint intermediate its ends enabling said conveyor assembly to fold in response to extension and retraction of said frame.

15. In a fruit harvester including a mobile support, a catcher and conveyor system comprising:
   an extensible and retractable frame extending outwardly from said support and including an elongated frame member extending longitudinally of the frame and defining an outward edge thereof;
   a conveyor extending along said frame member;
   a fruit-catching apron on said frame extending outwardly and downwardly from said support to said conveyor;
   an extension catcher assembly mounted on each end of said frame, each of said assemblies including an extension frame member pivotally connected to a respective end of said elongated frame member, each of said assemblies further including an extension apron having an end secured to a respective one of said extension frame members and extending inwardly toward said support in fruit delivery relation to said fruit-catching apron, means associated with said elongated frame member and said extension frame members such that disposing said elongated frame member against a tree to be harvested will serve to pivot said extension frame members upwardly to disposed said extension catcher assemblies in a position to gravity-feed fruit toward said fruit-catching apron and said conveyor.

16. A tree crop harvester comprising:
   a mobile support;
   an extensible and retractible frame mounted on said support and extending outwardly and downwardly from a side thereof, said frame including a pair of foldable arm assemblies pivotally mounted on said support at spaced points thereon, an elongated frame member pivotally mounted on said arm assemblies and defining the outer longitudinal edge of said frame;
   power means for extending and retracting said arm assemblies so as to move said frame member toward a tree to be harvested and back toward said support respectively;
   a foldable conveyor assembly mounted on one of said arm assemblies for coincident folding movement therewith as said frame member is moved toward and away from said support, said conveyor assembly having an intake end disposed proximate to said frame member and a discharge end disposed proximate to said support;
   a second conveyor extending along said frame member and having a discharge end disposed in fruit delivery relation to the intake end of said foldable conveyor assembly;
   an extensible and retractible apron mounted on said frame and extending outwardly and downwardly from said support to said second conveyor to provide gravity-feed of fruit into said second conveyor; and
   means operative to cease actuation of said power means in response to engagement of said frame member with a tree to be harvested whereby extension of said frame is automatically halted.

17. In a fruit harvester including a mobile support, a catcher and conveyor system comprising:
   an extensible and retractible frame mounted on said support and extending outwardly and downwardly therefrom in an inclined plane, said frame including an outboard member extending longitudinally of the frame and defining the outward edge thereof, a foldable arm assembly disposed in said plane pivotally interconnecting said outboard member with said support for moving said outboard member toward and away from said support;
   a foldable conveyor assembly mounted on said arm assembly for coincident folding movement with said arm assembly in said plane as said outboard member is moved toward and away from said support, said conveyor assembly having an intake end disposed proximate to said outboard member;
   a second conveyor extending along said outboard member and having a discharge end disposed in fruit-feeding relation to the intake end of said foldable conveyor assembly;
   a first fruit-catching apron on said frame extending outwardly and downwardly from said support toward said outboard member in gravity-feed relation to said second conveyor;
   a second fruit-catching apron pivotally mounted on said frame and extending outwardly from said outboard member on the opposite side thereof from said first apron; and
   power means for pivoting said second apron upwardly in response to disposing said outboard member against a tree to be harvested, whereby said second apron is automatically disposed in gravity fruit-feed relation to said second conveyor.

References Cited
UNITED STATES PATENTS

| | | | |
|---|---|---|---|
| 3,347,032 | 10/1967 | Pool et al. | 56—329 |
| 3,462,931 | 8/1969 | Thayer | 56—329 |
| 3,462,932 | 8/1969 | Pool et al. | 56—329 |

RUSSELL R. KINSEY, Primary Examiner